AIR CONTROL SYSTEM

Original Filed Aug. 29, 1968 4 Sheets-Sheet 1

AIR CONTROL SYSTEM

Original Filed Aug. 29, 1968 4 Sheets-Sheet 2

AIR CONTROL SYSTEM

Original Filed Aug. 29, 1968 4 Sheets-Sheet 3

"ON- OFF" BANDS

United States Patent Office 3,714,980
Patented Feb. 6, 1973

1

3,714,980

AIR CONTROL SYSTEM

Frederick N. Lancia, Columbus, and Ralph C. Liebert, Worthington, Ohio, assignors to Liebert Corporation, Columbus, Ohio Original application Aug. 29, 1968, Ser. No. 756,093. Divided and this application Mar. 16, 1970, Ser. No. 24,450
Int. Cl. F24f 3/14
U.S. Cl. 165—11 5 Claims

ABSTRACT OF THE DISCLOSURE

This invention relates to temperature and/or humidity electrical/electronic controls to maintain an enclosure at a constant temperature and humidity. Specifically, the electrical/electronic controls provide a step function to actuate one or more temperature and/or humidity conditioners in response to the degree of change.

BACKGROUND

This is a division of application Serial Number 756,093, filed Aug. 29, 1968, for "Air Control System," by Frederick N. Lancia and Ralph C. Liebert.

The prior art is replete with temperature and humidity control circuits. There is also commercially available apparatus that provides both functions and still there is apparatus that combines the temperature and humidity functions. Each of the prior art devices, however, have many features that render them unsuitable for their intended purpose.

In the first instance, the cost and accuracy curve is out of proportion, that is, to obtain accuracy, the cost is prohibitive; while on the other hand, low cost devices are so inaccurate that they are relatively useless. The prior art devices—the electronic circuits—are of the outdated vacuum tube type. Solidstate circuits are not available.

In operation, it has been found that one of the serious electrical disadvantage of the prior art devices are their tendency to "hunt." That is, at a given setting— whether it is temperature or humidity—the apparatus is on and off, back and forth. At times heating and cooling (or wetting and drying) are alternately turned on and off as the controls hunt.

A more significant electrical disadvantage is that heating-cooling or wetting-drying apparatus in major installations is large and expensive. Even in those installations where several pieces of apparatus are utilized, they are still large and expensive. In the prior art systems a slight deviation of the temperature or humidity from the set point causes the entire system to turn on.

BRIEF DESCRIPTION OF THE INVENTION

The present invention provides apparatus and system for maintaining a desired temperature and humidity without the above-noted disadvantages. Generally, to avoid the hunting of the system about the set point, the circuit of the present invention provides a dead band. That is, the deviation of the temperature or hunting must exceed a predetermined amount above or below the set point prior to actuation of the condition apparatus.

In a system configuration for a major installation, the preferred embodiment includes a step function of control. A deviation beyond the predetermined amount will cause the actuation of only a first conditioning apparatus; deviation beyond a second predetermined amount causes the actuation of a second conditioning apparatus; deviation beyond a third predetermined amount causes the actuation of a third conditioning apparatus.

The electronic circuits for determining the above-noted set points and predetermined settings comprise solidstate circuitry of conventional and commercially available components of relatively low cost.

OBJECTS

It is accordingly an object of the present invention to provide a new and improved temperature and humidity control system for actuating conditioning apparatus.

It is a further object of the present invention to provide in an air conditioning system temperature and humidity actuating controls response beyond a predetermined amount above or below a set point to eliminate hunting.

It is another object of the present invention to provide an air conditioning system that is responsive in operational sequency in accordance with a step function related to the change.

It is another object of the present invention to provide a temperature and humidity control system that is made up of solidstate components that are commercially available and relatively inexpensive.

Other objects and features of the present invention will become apparent from the following detailed description when taken in conjunction with the drawings in which:

DETAILED DESCRIPTION OF THE DRAWINGS

Figure 1:
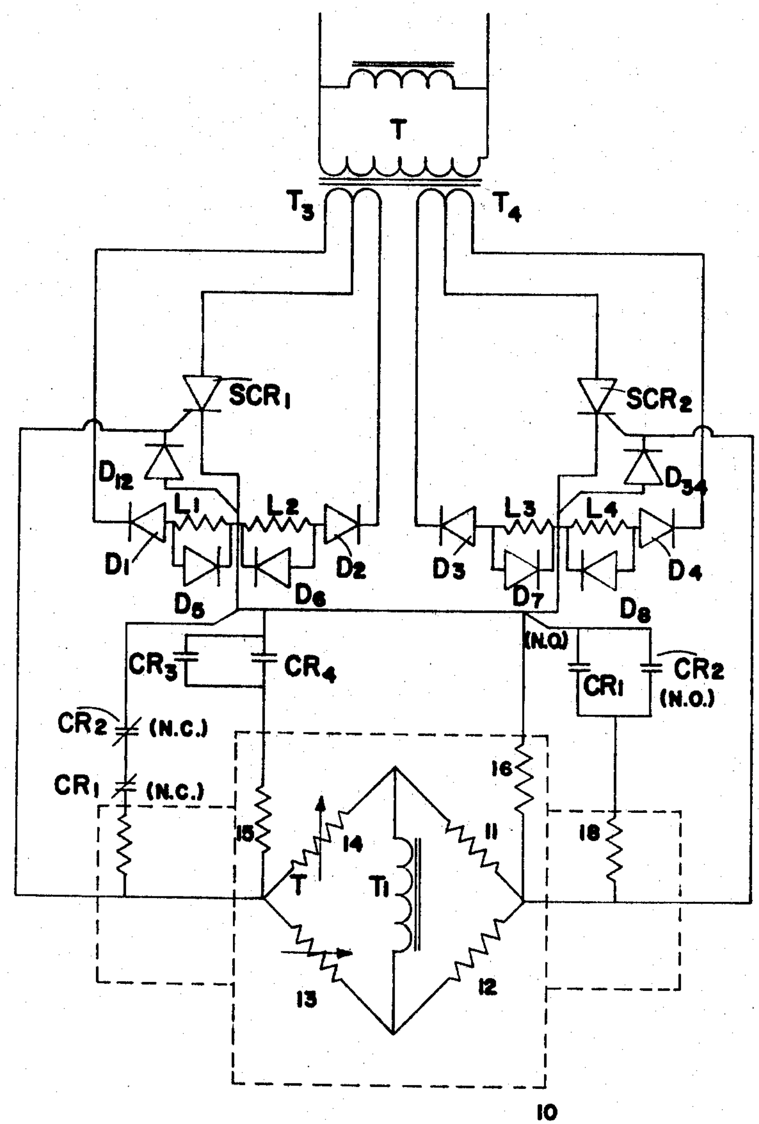
FIG. 1 is a fundamental circuit illustrating the general concepts of the present invention.

The bridge circuit 10 enclosed in the dotted line box in FIG. 1 is the over/under sensor monitor. (For purposes of simplicity, the term sensor as used hereinafter is to imply either temperature or humidity.) The transformer T1 is a filament type of secondary winding to the transformer T. The winding T1 is connected to the inside of the four arm bridge 10; the bridge further comprising resistors 11, 12, and 13 in balance. Resistor 13 is a variable resistance and is utilized in the present invention for establishing the set point. Resistor 14 is also a variable resistance in the bridge but in the preferred embodiment is actually the sensor element.

SCR1 and SCR2 are gate biased to prevent conduction—the D.C. resistance of the bridge 10 is sufficiently low to stabilize the two SCR's during forward blocking periods. When the bridge is in balance, that is, when the resistance of the sensor 14 is equal to the resistance of the set point resistor 13, the A.C. output of the bridge is zero. With the bridge in balance SCR1 or SCR2 does not receive a gate signal and therefore remains quiescent.

If the air condition of the room being monitored should vary, and such variation is detected by the sensor 14, its resistance will decrease or increase in accordance with the variation. This will cause the bridge to become unbalanced and thereby cause an A.C. voliage to be applied across SCR1's gate cathode terminals. Under one ambient condition, that causes the sensor 14 to drop in resistance, the positive gate voltage applied to the SCR1 will be in phase with the A.C. supply across secondary T3. In the opposite ambient condition, that causes the sensor 14 to increase in resistance, the positive gate voltage applied across the SCR1 will be 180° out of phase with the A.C. supply across secondary T3.

When the sensed A.C. voltage across bridge 10 is a positive gate voltage, in phase with the applied voltage, SCR1 provides a load current through diode D1 to load L1. In this instance diode D2 being reverse biased blocks current to load L2. Alternatively, if the positive gate voltage across the bridge 10 is 180° out of phase with the applied voltage to SCR1, diode D2 will conduct and deliver power to load L2. In this instance D1 being reverse biased will prevent current being applied to L1. The function of D12 is to prevent excessive negative voltage from appearing across SCR1 gate cathode terminals and is not intended to affect its operation. D5, D6, D7, and D8 are to prevent the inductive effect of coils L1, L2, L3, and L4, respectively.

As described above, a primary improvement in the preferred embodiment is in the step-control function of the control circuit. In a system for heating/cooling and wetting/drying, it would not be economical for the entire system to respond to a given set of ambient conditions.

In a typical prior art system for instance, if temperature were being measured and the sensor would sense a one degree change, the entire cooling/heating system would respond. In the present invention, however, as exemplified in the circuit of FIG. 1, there is provided an additional circuit to yield a second control signal in response to sensed deviations that exceed a predetermined second set point. Specifically, a one degree change in temperature may excite a first circuit to cause the actuation of a first given set of conditioners. If the temperature sensed should be greater than the second set point, for instance three degrees, a second signal would be yielded to actuate a second set of conditioners.

In the circuit of FIG. 1 the SCR2 circuit is identical in function to the SCR1 circuit above described. There is interposed, however, a bleeder resistor 16 in the gate cathode circuit of SCR2. In operation, SCR2 requires a predetermined value of voltage/current to cause it to fire—the value being in excess of that to cause SCR1 to fire. Specifically, resistor 16 in a conventional manner bleeds away a portion—a given amount—of the current from the bridge. Therefore, to cause SCR2 to fire, a greater value of voltage/current must be passed through bleeder 16. That is, a sufficient potential to exceed that bled off and sufficient to fire SCR2. Accordingly, to fire SCR2 a greater unbalance of the bridge 10 is required.

A third step function may also be utilized from the circuitry of FIG. 1. Upon SCR2 firing—as described above—bleeder resistor 15, by relay CR2, is placed across the gate cathode of SCR1. When this occurs, SCR1 is commutated, i.e., turned off. At this point a greater unbalance across the bridge 10 is required to fire SCR1 again for the third step. In other words, SCR1 is fired for the first step, SCR2 is fired for the second step, and SCR1 turned off and then SCR1 fired again for the third step. The predetermined value—the step function—is, of course, determined by the size and value of bleeders 15 and 16.

Figure 2:
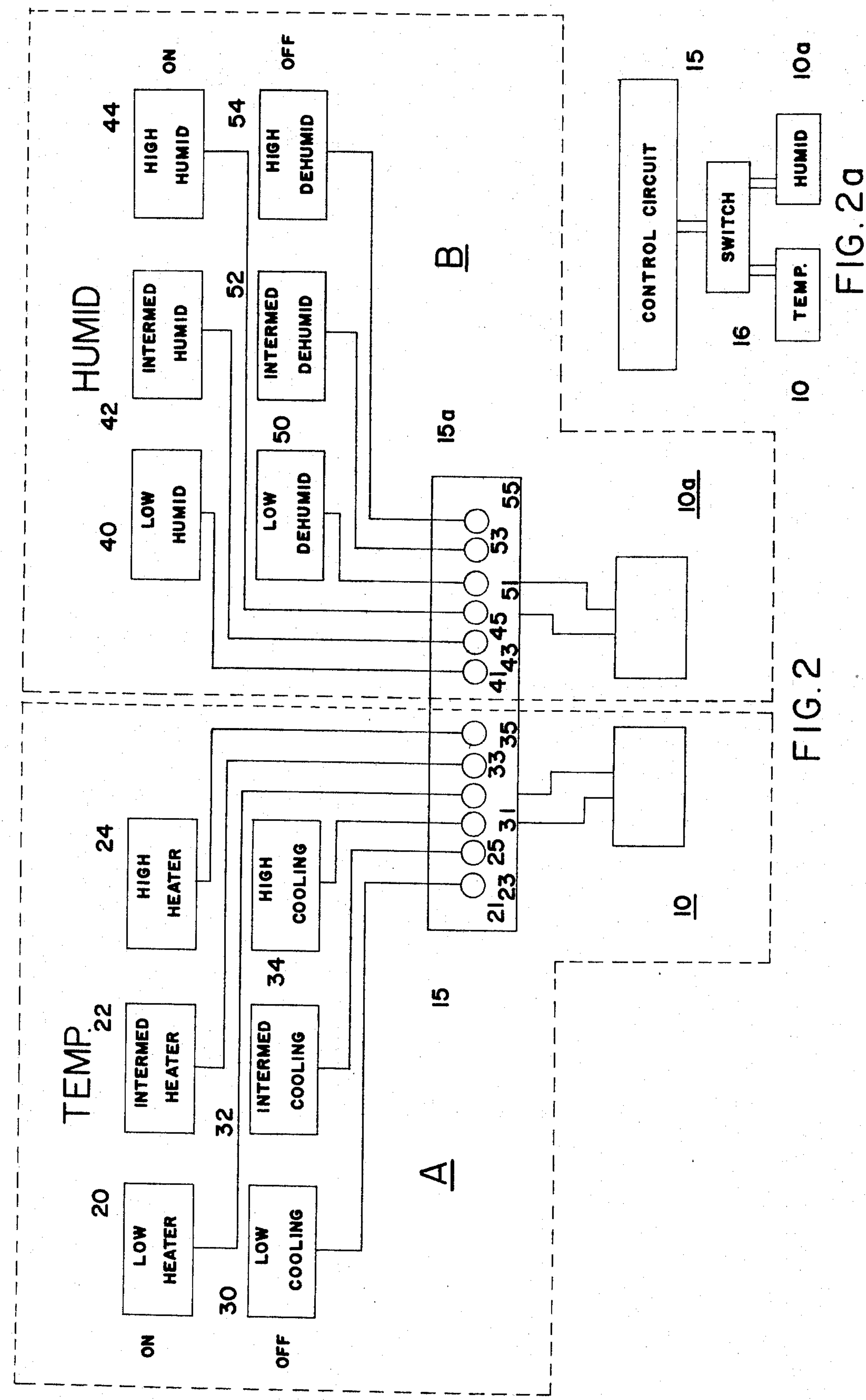
FIG. 2 is a block schematic illustration of an air conditioning system utilizing the controls of the present invention.

A heating/cooling and wetting/drying system utilizing the control circuit of the present invention is illustrated in FIG. 2. In the temperature control system A there are provided low 20, intermediate 22 and high 24 heaters. There are also provided cooling systems comprising a low 30, intermediate 32 and high 34. The control circuit 15 is basically that of FIG. 1 and more specifically that of FIG. 3, as described hereinafter. The temperature sensor 10 is that of the bridge circuit of FIG. 1. Pilot lights 31, 33, and 35 correspond to the low, intermediate, and high heaters 20, 22, and 24. Pilot lights 21, 23, and 25 correspond to the low, intermediate, and high coolers 30, 32, and 34. In operation of the temperature cooling system A, a low temperature sensed variation by bridge 10 will cause—through the control circuit of 15—actuation of the low heater 20. If the temperature variation falls below a second set point, the control circuit will actuate tntermediate heater 22; and if the temperature falls below a third set point, the control circuit 15 will cause the actuation of high heater 24. The pilot lights 31, 33, and 35 visually indicate whether the one or all three heaters have been actuated. Further, assuming that the temperature variation is sufficient to have caused each of the three heaters 20, 22, and 24 to be actuated, as the hot air from the heaters causes the temperature of the air to rise, the bridge 10 will sense this increase in temperature. The reverse swing of the sensor 10 will deactivate in reverse order the high heater 24, the intermediate heater 22, and finally the low heater 20. In this way the high heater—the most costly to operate—will be on only a relatively short time of the heating cycle. Also, again assuming all three coolers have been activated, as the cool air from the cooler causes the temperature to drop, the bridge 10 will sense the drop. The reverse swing of the sensor 10 will deactivate in reverse order the high cooler 34, intermediate cooler 32, and finally the low cooler 30.

If the temperature sensed by bridge 10 should show an increase, low cooler 30 will become actuated. Intermediate cooler 32 and high cooler 34 will become activated dependent upon whether the increase in temperature exceeds the second or third set point. Pilot lights 21, 23, and 25 visually indicate which of the coolers are in operation. Again, as in the heating system, the high cooler 34 will be in operation only for a relatively short duration of the cooling cycle.

In the humidity control portion of the system B, there is provided a low humidifier 40, intermediate humidifier 42, and a high humidifier 44; also to provide air drying, there is provided a low dehumidifier 50, intermediate dehumidifier 52, and high dehumidifier 54. Pilot lights 41, 43, and 45 visually indicate respectively whether humidifier 40, 42, 44 have been actuated and pilot lights 51, 53, and 55, respectively, indicate whether the dehumidifier 50, 52, and 54 have been actuated. The bridge circuit 10*a*, in this instance, is a humidistat and will sense variations in humidity. In this circuit—in similar operation to the temperature circuit—a first, second and third set point is provided for percentages of humidity below and above a normal condition. Whether one, two or the three of either the humidifiers is actuated is dependent upon whether or not first, second or third set points has been exceeded in the first direction. Whether one, two or three of the dehumidifiers is actuated is dependent upon whether or not first, second, or third set points have been exceeded in a second direction. The operation of humidity section of the system is identical to that of the temperature section.

In the event that the sensor 10*a* should indicate that drying of the air is needed, it is to be appreciated that the drying of the air will also cause the temperature of the air to cool. Accordingly, there is an interchange between temperature and humidity; therefore it is desired, in most installations, that the temperature and humidity be monitored simultaneously. This can be done, as shown in FIG. 2, by providing dual sensors 10 and 10*a* in conjunction with two separate control circuits 15 and 15*a*.

In the over-all cost of the control circuit 15, the bridge 10 is perhaps the least. However, although separate sensors are necessary, it is not necessary to use separate control circuits. Therefore, with reference to FIG. 2*a*, there is shown an alternative embodiment utilizing a single control circuit 15 and separate sensors 10 and 10*a*, through the utilization of the switch 16. In this embodiment switch 16, which can be either mechanical or electrical, alternately connects temperature bridge 10 and the humidity bridge of 10*a* to the control circuit 15.

Figure 3:
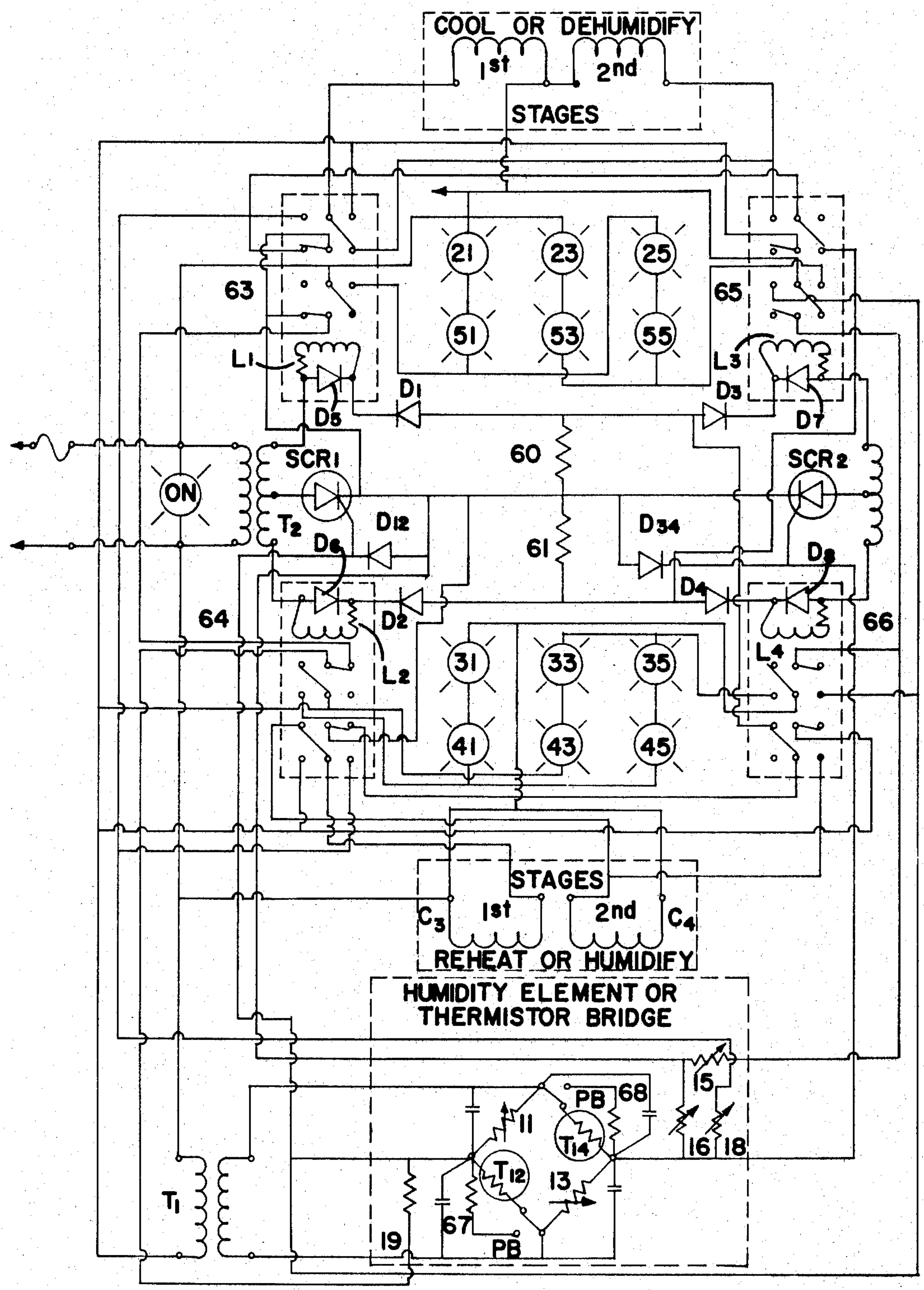
FIG. 3 is a detailed circuit illustrating a preferred embodiment of the present invention.
Figure 3A:
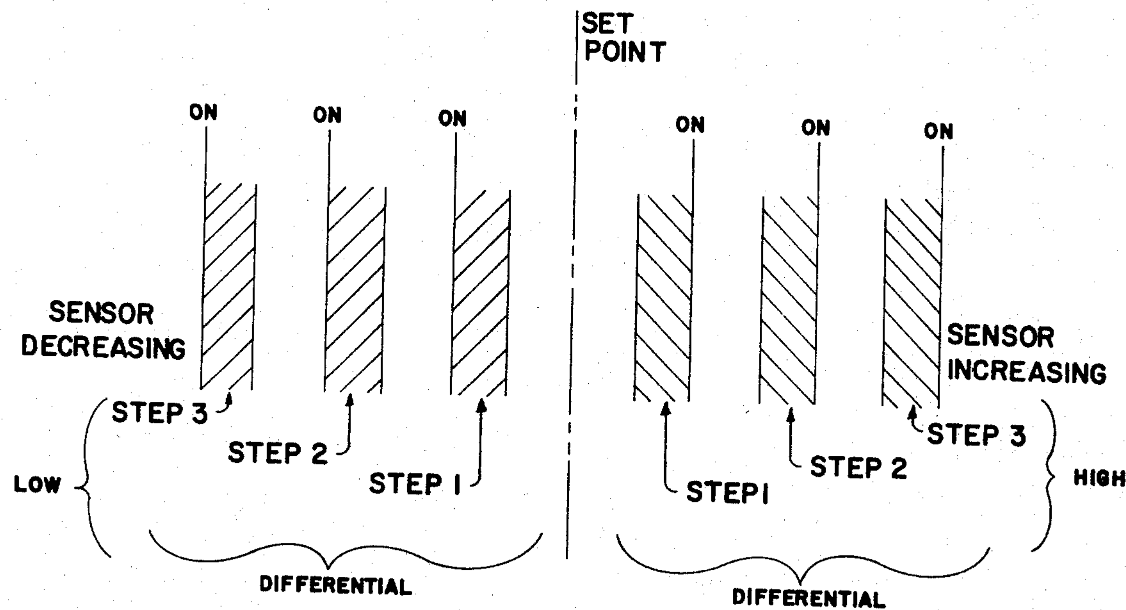
FIG. 3*a* is an illustration of the on-off control bands relative to the set point.

Referring to FIG. 3 there is shown in detail a preferred embodiment of the circuit for accomplishing the heating/cooling, humidifying/dehumidifying of the system of FIG. 2. Specifically, the circuit of FIG. 3 is the control circuit 15 of FIG. 2 that is designed to yield a six-output, over-under control with a differential for each step.

As described above, the circuit of FIG. 1 provided a six-output, over-under control; that is, the SCR1 circuit provided a first under or over control and the SCR2 circuit provided a second under or over control. The detailed circuit of FIG. 3 utilizes the basic circuits of FIG. 1 to provide the six-output, over-under control with the additional step function of under and over accomplished with the combination of two SCR circuits.

In FIG. 3 the load circuit L1 with diode D1, L2 with diode D2, in the SCR1 control, and L3 with diode D3, L4 with diode D4 in the SCR2 control circuit are substantially identical in configuration and operation to their counterparts in FIG. 1. That is, each load circuit is respectively responsive to the in-phase and out-of-phase condition as described.

The indicator lights 21/51, 23/53, and 25/55, indicate the three-step conditions of the degree of departure below the set points. That is, whether the first, second and third set points have been exceeded. Similarly, 31/41, 33/43, and 35/45 indicate the three-step conditions of the degree of departure above the set points—again, whether the first, second and third set points have been exceeded.

Relay 63 is operational—upon receipt of a voltage—to actuate the first indicator 21/51 and the control winding L1. Similarly, relay 65 is operational to activate control winding L3 and indicator 23/53, while deactivating relay 63.

Further, upon the bridge unbalance being such to exceed the third set point—in a first given condition—that is, exceeds the predetermined input voltage level of SCR1 and SCR2, both control windings L1 and L3 will be energized. Also, indicator light 25/55 will be lighted.

In the second given condition relay 64 is operational, upon receipt of a voltage, to actuate the indicator 31/41 together with the control winding L2. The relay 66 is operational to activate control winding L4 together with the indicator 33/43, while deactivating L2. And—upon the bridge unbalance being such to exceed the third set point in the second given condition, that is, exceeds the predetermined input voltage level of SCR1 and SCR2, both control windings L2 and L4 will be energized, and indicator light 35/45 will be lighted.

It necessarily follows, of course, as the conditioning apparatus changes the condition of the air (temperature or humidity) the bridge 10 will so respond. As the response continues, the apparatus is turned off in reverse sequence until the temperature and humidity is approximately that of the set point.

As pointed out above, it is characteristic of control circuits to be actuated upon a slight deviation above or below its set point. In many instances—especially in temperature and humidity—there may be constant deviations slightly above and below a given set point. In practice, this causes the conditioning equipment to be continuously actuated and deactuated on both sides of the set point. That is, the heating and cooling apparatus (or the humidifying and dehumidifying apparatus) are alternately turned on and off; this is commonly known as "hunting."

To eliminate the undesirable consequences of hunting about a set point, there is provided in the circuit of the present invention a dead band. That is, the deviation above or below the set point must exceed a given amount before the control circuit is actuated. Specifically, when SCR1 fires, CR2 and CR1 opens (normally closed) causing bleeder resistor 19 to be taken out of the circuit by the relay action. At this time there is required a smaller value of voltage/current to cut off SCR1. When SCR1 does cut off, then CR2 (normally closed) or CR1 (normally closed) closes again, i.e., first deadband (differential).

Also, when SCR1 fires actuating relay 63 or 64, contacts CR1 (N.O.) or CR2 (N.O.) close placing resistor 18 across the gate of SCR2.

When SCR2 fires, after second set point has been exceeded, CR4 or CR3 closes placing resistor 15 across the gate of SCR1 which turns SCR1 off. When SCR1 commutates (turns off) CR1 (N.O.) or CR2 (N.O.) opens removing resistor 18 from across the gate of SCR2. Now a lower potential/current is required to hold SCR2 on than was necessary to fire SCR2 with resistor 18 across the gate—this provides a differential or deadband for the second step.

Since resistor 15 is across the gate of SCR1 after SCR2 fires, a greater unbalance is necessary to fire SCR1 which provides a third step. When SCR1 fires at the greatest unbalance CR1 (N.C.) or CR2 (N.C.) opens removing resistor 19 from across the gate of SCR1 (as it did for the first step firing) providing a differential or deadband for the third step.

In FIG. 3 resistors 60 and 61 are part of an interlock feature which reduces power available to one side of the circuit when the other is activated. For example, when relay 64 is activated calling for reheat stages power available to relays 63 and 65 is reduced so that they cannot actuate, thus preventing cooling and reheat stages operating simultaneously.

In FIG. 3 a pushbutton (PB) provides for calibration of the bridge by inserting temporarily resistors 67 and 68 for the sensing elements 12 and 14. In practice this would correspond to a specific level of humidity or temperature.

In summary, there is provided an air conditioning system that includes both temperature and humidity. The temperature and/or humidity apparatus is economically controlled in a manner wherein the degree of deviation above or below the set point dictates which of the several pieces of apparatus are to be actuated. A deadband is provided to assure that the equipment will not hunt about a set point. Finally, the circuit is solidstate, inexpensive, simple and extremely reliable.

Although certain and specific embodiments have been illustrated, it is to be understood that modifications may be made without departing from the true spirit and scope of the invention.

What is claimed is:

1. A system for controlling the air condition of a closed environment, a plurality of apparatus for restoring the air condition upon variation either above or below a predetermined condition, a sensing circuit responsive to deviations above or below said predetermined condition, a first, second, and third solidstate control circuit connected to said sensing circuit, means for connecting said first, second, and third control circuits to respective apparatus for restoration of said air condition above and below said predetermined condition responsive in sequence to the degree of variation above or below said predetermined condition thereby actuating in sequence one or more of said apparatus, and means for indicating which of said apparatus is being actuated.

2. A system as set forth in claim 1 wherein said air condition is temperature and wherein said sensing means is temperature responsive.

3. A system as set forth in claim 1 wherein said air condition is humidity and wherein said sensing means is humidity responsive.

4. A system as set forth in claim 1 wherein said air condition is temperature and humidity and wherein said sensing means comprises temperature sensors and humidity sensors, and means for alternately connecting said temperature sensors and said humidity sensors to said control circuits.

5. A system as set forth in claim 1 further comprising means for providing a current differential for each of said semiconductive circuits upon actuation thereof to thereby provide a deadband between said circuits.

References Cited

UNITED STATES PATENTS

| | | | |
|---|---|---|---|
| 3,444,921 | 5/1969 | Carapico, Jr. | 165—21 |
| 3,587,558 | 6/1971 | Raleigh | 165—21 |

CHARLES SUKALO, Primary Examiner

U.S. Cl. X.R.

165—21, 26